Figure 1:
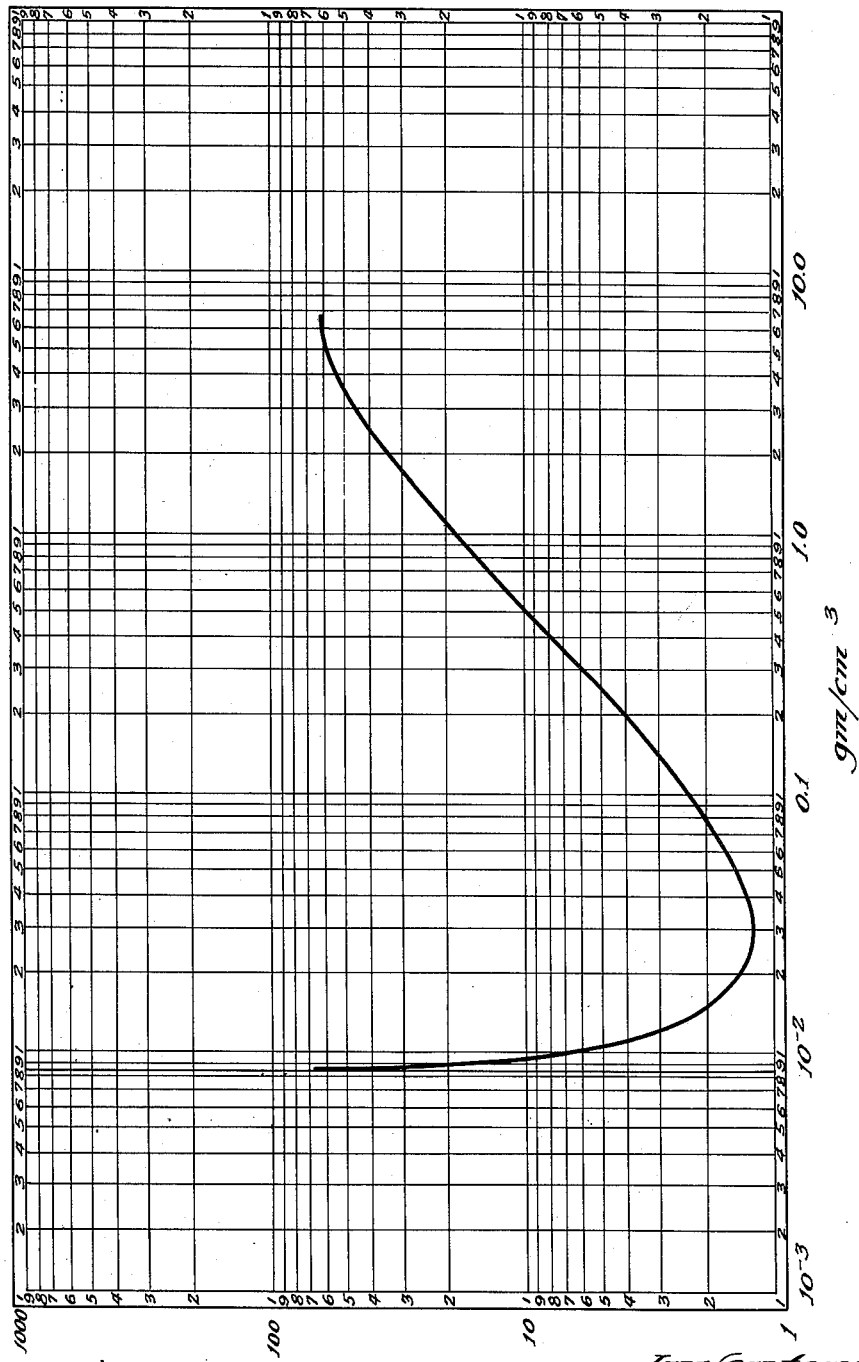

March 3, 1964     G. T. SEABORG ETAL     3,123,535
DEVICE FOR PRODUCTION OF NUCLEAR ENERGY FROM U$^{233}$
Filed Nov. 30, 1944     3 Sheets-Sheet 1

Inventors:
Glenn T. Seaborg
John W. Gofman
Raymond W. Stoughton
By: Robert A. Lavender
Attorney:

March 3, 1964  G. T. SEABORG ETAL  3,123,535
DEVICE FOR PRODUCTION OF NUCLEAR ENERGY FROM U²³³
Filed Nov. 30, 1944  3 Sheets-Sheet 3

Inventors:
Glenn T. Seaborg
John W. Gofman
Raymond W. Stoughton
By: Robert A. [Attorney]
Attorney.

United States Patent Office 3,123,535
Patented Mar. 3, 1964

3,123,535
DEVICE FOR PRODUCTION OF NUCLEAR
ENERGY FROM $U^{233}$
Glenn T. Seaborg, Chicago, Ill., John W. Gofman, Berkeley, Calif., and Raymond W. Stoughton, Oak Ridge, Tenn., assignors to the United States of America as represented by the United States Atomic Energy Commission
Filed Nov. 30, 1944, Ser. No. 565,990
9 Claims. (Cl. 176—41)

The invention relates to the production of energy and fission products, and more particularly to the production of energy and fission products by self-sustaining nuclear chain reactions involving the reaction of neutrons, with the isotope of uranium having a mass number of 233 (this isotope being also designated herein as $U^{233}$).

One object of the invention is to provide masses and compositions which are particularly suitable for use as a source of nuclear power and/or radioactive fission products.

Other objects and advantages of the invention will become apparent as the following detailed description progresses.

In this specification and claims the name of the element is used to designate the element generically, either in its free state or combined in a compound, unless otherwise indicated by the sense in which it is used or by a specific designation such as "metal" or "elemental." The term "isotope," when employed in conjunction with the name of a given element, is intended to be construed broadly and not necessarily with reference to the said given element, unless indicated otherwise by the context.

The isotope $U^{233}$ has a half life of about $1.2 \times 10^5$ years, emitting alpha particles with a range of 3.1 to 3.2 cm. in air at 760 mm. pressure and room temperature of 20° C. In accordance with our invention we have found that $U^{233}$ undergoes fission with neutrons and that the cross section for slow neutron fission of $U^{233}$ is of the order of 100 times greater than the slow neutron absorption by thorium.

The fission of $U^{233}$ may be effected by bombardment or irradiation of $U^{233}$ or compounds, mixtures, solutions, alloys or other compositions containing substantial amounts of $U^{233}$ with neutrons produced by the cyclotron or by other suitable source.

The fission products which are produced as a result of $U^{233}$ with slow neutrons are so far as we have been able to determine, the same as those produced by the fission of $U^{235}$. They consist of a large number of elements which fall into a light group with atomic numbers from 35 to 46 inclusive, and a heavy group with atomic numbers from 51 to 60 inclusive, and which undergo beta decay. The radioactive fission products which have a half life of more than three days will remain in the reaction mass in substantial quantities at least one month after the termination of the reaction, and the removal of these products by our process is particularly advantageous. Among these products are: Sr, Y, Zr, Cb, Ru, Te, I, Xe, Cs, Ba, La, and Ce of a 20 day half life, and Ce of a 200 day half life.

In accordance with a preferred modification of our invention we have found that $U^{233}$ is capable of undergoing self-sustaining nuclear chain reactions with neutrons particularly with neutrons of thermal energy. By a self-sustaining nuclear chain reaction is meant a nuclear reaction in which, for example, a neutron initially striking a $U^{233}$ nucleus reacts to produce fission accompanied by the emission of neutrons, enough of which are available, after loss by leakage, etc., for further fission reaction upon $U^{233}$ so that the reaction either continues at the same rate (as where one neutron per fission is available for fission of $U^{233}$), or builds up in intensity (as where more than one neutron per fission is available).

Elemental $U^{233}$, for example, may be made into a compact mass of a given shape such as a sphere or other shape. When the mass of the $U^{233}$ is below a certain critical mass the $U^{233}$ is relatively stable, i.e., it will undergo fission but will not undergo a self-sustaining chain reaction when such a mass is irradiated with neutrons. Neutrons which, for example, are normally present in the surrounding atmosphere, or present for any other reason, cannot increase in number and continue to react because such neutrons are either absorbed by foreign material before they react with the $U^{233}$ or the neutrons which may be produced during fission are either absorbed by foreign material or lost to the surroundings to such an extent that sufficient neutrons are not available to continue or build up the reaction.

However, when the mass of $U^{233}$ reaches or exceeds a certain critical value the number of neutrons escaping from the mass or otherwise unavailable for reaction is not sufficient to decrease the neutrons available for reaction to less than one neutron per fission so that the neutrons continue to react with nuclei of $U^{233}$ in what is called a self-sustaining nuclear chain reaction. When the number of neutrons available for reaction with further $U^{233}$ is greater than one per fission, the number of neutrons produced during the reaction continues to increase and we have a type of self-sustaining nuclear chain reaction which is called a divergent chain reaction. In order that these evolved neutrons may be used efficiently for further fission of further $U^{233}$ and to minimize loss or leakage of neutrons it is found desirable to disperse the $U^{233}$ in a neutron slowing medium capable of slowing the speed of evolved neutrons without excessive absorption such as water, $D_2O$, graphite, paraffin, beryllium, etc. so that the fission neutrons are slowed to thermal energies without absorbing too many neutrons.

The minimum mass of $U^{233}$ within which a self-sustaining nuclear chain reaction will take place is called the critical mass. A self-sustaining nuclear chain reaction of a critical or more than critical mass of $U^{233}$ will take place by itself, probably starting by the action of neutrons present in the surrounding atmosphere, or resulting from the presence of small amounts of certain light elements such as beryllium or lithium with the alpha-emitting $U^{233}$, or due to spontaneous fission.

In general, self-sustaining nuclear chain reactions with $U^{233}$ may be brought about by increasing the effective mass of the isotope from a subcritical mass to a critical mass. This increase may be brought about by simply bringing together two or more subcritical masses to produce a combined mass of the critical or more than critical amount, or it may be brought about in other ways, for example, having a mass which is subcritical because it contains a neutron absorber such as cadmium or boron and then making the mass critical by removing the neutron absorber or a portion thereof. The increase of effective mass may also be brought about by having a mass which is subcritical because of too great an escape of neutrons and making the mass critical or more than critical by reflecting neutrons back into the mass by bringing a neutron reflector in close proximity to the mass. For example the mass comprising $U^{233}$ and a neutron moderator (neutron slowing medium) may be enclosed in graphite which reflects the neutrons. Other means of increasing the effective mass will be apparent.

The optimum shape for a self-sustaining chain reacting mass is a sphere. However, other shapes may be used such as cylinders and cubes, but where one dimension is extremely small as in the case of cylinders of small diameter, the critical mass required may be impractically large.

In accordance with a suitable method of carrying out neutron chain reactions, the $U^{233}$ is intimately mixed with neutron slowing material, the concentration of $U^{233}$ being sufficiently high and the amount sufficiently large so that a chain reaction will take place with a finite mass of $U^{233}$, but the concentration being not so high that the chain reaction will occur with excessive rapidity. In general, the minimum concentration of $U^{233}$ will be such that on the average only one of the neutrons emitted in the fission process will be absorbed by the $U^{233}$, assuming an average of about two neutrons per fission.

The minimum concentration of $U^{233}$ is such that the probability of capture of slow neutrons by $U^{233}$ is slightly greater than the probability of capture of slow neutrons by the slowing medium or any other nonfissionable material present in the composition.

The maximum concentration of $U^{233}$ should be such that more than 50 percent and preferably more than two-thirds of the neutrons emitted by fission and which do not escape are slowed to thermal energies.

In bringing about a slow neutron self-sustaining chain reaction the composition comprising $U^{233}$ and neutron slowing material in suitable concentration is increased in mass from a mass in which $U^{233}$ is present in a subcritical amount to a mass in which the $U^{233}$ is present in critical or above critical amount. This increase in mass may be done in various ways. For example, where the composition is a liquid such as a solution or slurry of $U^{233}$ or a compound thereof the mass may be simply increased by flowing liquid into a container until the container holds an amount of liquid which contains a critical or more than critical mass of $U^{233}$ and if the reaction tends to occur with excessive rapidity a portion of the solution may be removed to reduce the amount to less than critical mass or to a value more closely approximating critical mass.

The critical mass of $U^{233}$, i.e., the minimum amount of $U^{233}$ which when present in a body comprising $U^{233}$ and slowing down material is just sufficient to attain a self-sustaining slow neutron chain reaction, is such that if we consider the $U^{233}$ as being in the form of a sphere the radius of the sphere is of the order of the distance required to slow down fission neutrons from their fast neutron energy to thermal energy, i.e., from average energies of about 2 mev. (velocity of about 10,000 miles per second) to average energies of about 0.03 electron volt (or a velocity of about 1 mile per second.)

The critical mass required to establish a self-sustaining chain reaction is dependent upon the nature of the neutron slowing material and also upon the amount of $U^{233}$ which is dispersed throughout the neutron slowing material. This will be more clearly understood by reference to the accompanying drawings in which FIG. 1 is a graph illustrating the variation of the critical mass in kilograms of a uniform dispersion of $U^{233}$ in water required for a self-sustaining chain reaction for a variation of concentration of $U^{233}$ in the dispersion in terms of grams per cc.

Figure 2:
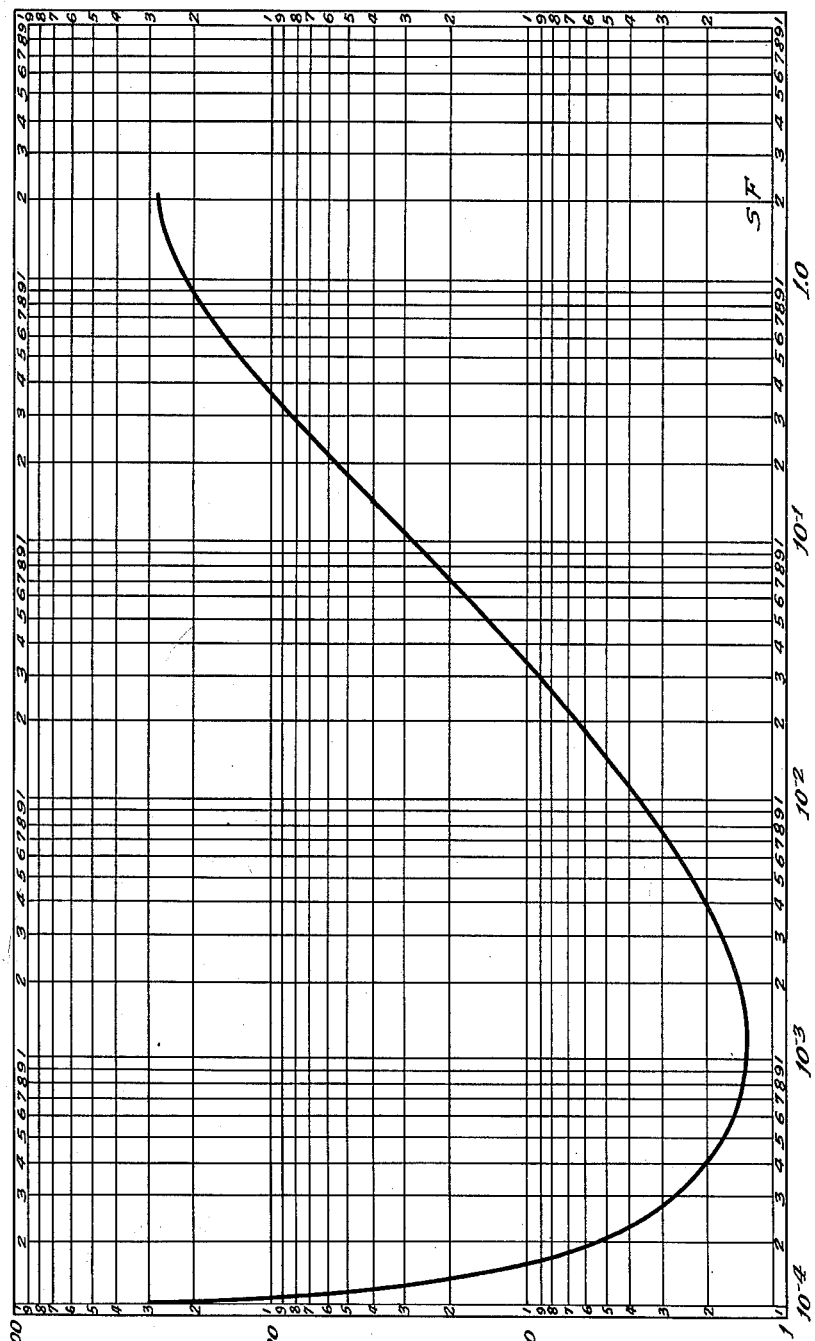
Figure 3:
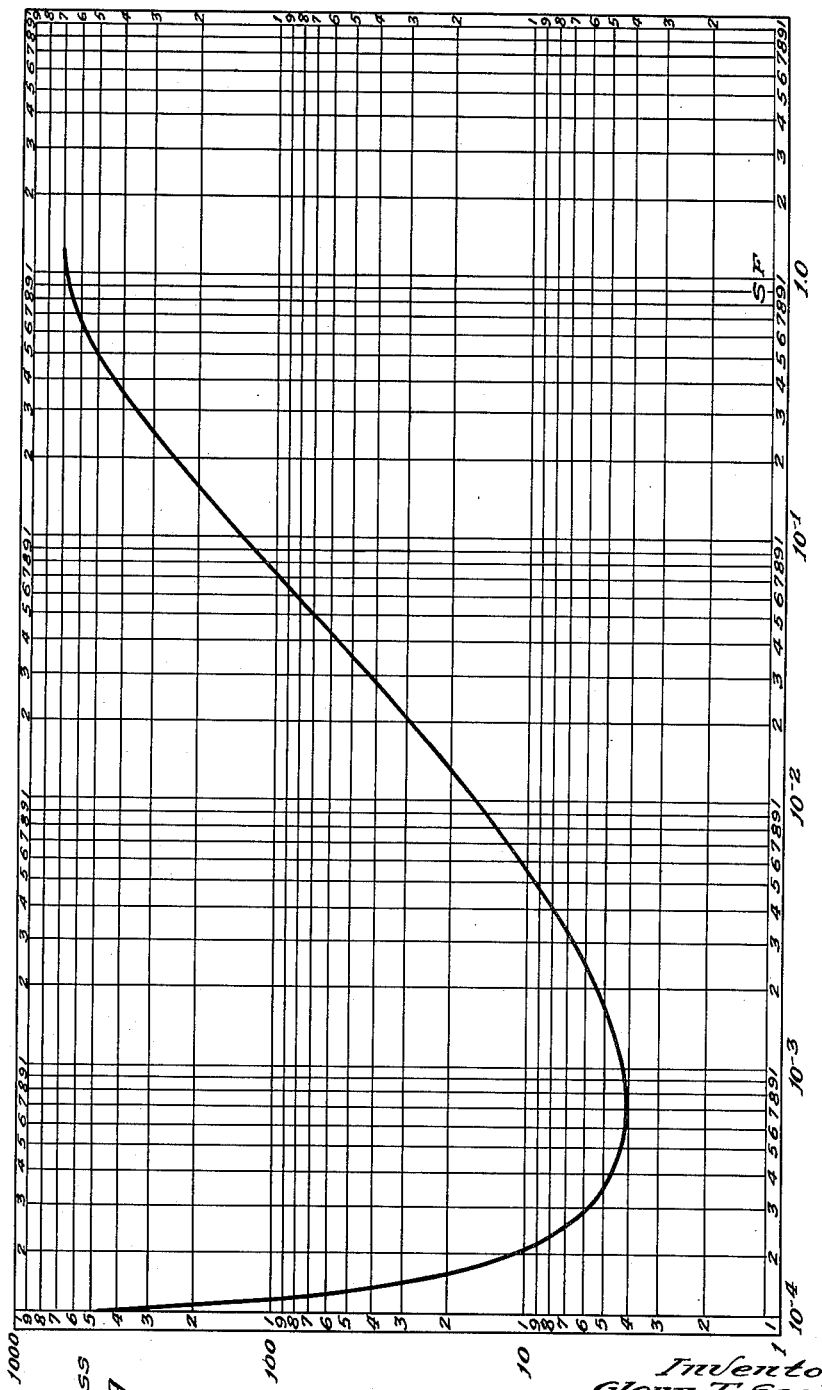

FIG. 2 is a similar graph illustrating critical mass when heavy water ($D_2O$) is used as a moderator in lieu of water, and FIG. 3 is a similar graph showing critical mass when carbon is used as a moderator.

The values upon which these graphs are based are approximate values which have been determined for a spherical dispersion. Where the moderator is in the form of a cube or parallelpiped or other form, somewhat higher values for critical mass may be required.

From a consideration of these graphs it will be apparent that the critical mass of $U^{233}$ in the slow neutron chain reaction varies with the concentration of $U^{233}$ dispersed in the moderator. It will also be seen that the critical mass is infinity at an extremely low but finite concentration and decreases rapidly with increasing concentration until it reaches a minimum point whereupon the critical mass increases relatively slowly with increasing concentration due to the fact that with more concentrated dispersions more neutrons are lost and their use in creating further fissions is less efficient.

The smallest critical mass of $U^{233}$ for a slow neutron chain reaction prevails as a general rule when the $U^{233}$ is present intimately dispersed with the slowing down material in such a manner that the probability of capture or thermal neutrons by $U^{233}$ is about three times as great as for the slowing down material.

For slow neutron chain reactions with $U^{233}$, suitable neutron slowing materials are substances having a neutron capture cross section of less than about $10^{-24}$ square centimeters. Preferably such substances are selected from those having a mass of less than 30 mass units. Such substances include hydrogen, deuterium, helium, fluorine, oxygen, carbon, and beryllium. If desired, these elements may be combined in compounds such as water, heavy water, or paraffin in which the respective atomic nuclei all have a capture cross section of less than about $10^{-24}$ square centimeters.

The slowing down material may be incorporated with $U^{233}$ in various ways. The $U^{233}$ may be dispersed in the slowing down material, such as a solution of a suitable compound of $U^{233}$ in water or heavy water. It may be intimately mixed with the slowing down materials, for example, as small particles of metallic $U^{233}$ dispersed in carbon or paraffin. The particles may range in size from atomic or molecular dimension to macroscopic size such as spheres of metallic $U^{233}$ separated by carbon, hydrogen, water or other suitable neutron slowing down material, but in order to have an efficient system which does not waste $U^{233}$, the diameter of the particles of $U^{233}$ preferably should not be less than about 0.2 mm., and it is preferred that the $U^{233}$ be intimately dispersed in the slowing medium.

Slowing down material may also be incorporated with $U^{233}$ by employing a compound of $U^{233}$ containing one or more of the slowing down substances such as those mentioned above. As examples of such compounds there may be mentioned uranium ($U^{233}$) carbide and uranium ($U^{233}$) hydride. However, the ratio of $U^{233}$ to slowing down material in such systems is fixed and, therefore, may not be suitable in all cases, particularly where some latitude of control is desired. In such cases the concentration may be further controlled by mixing the given compound with additional slowing down substances to provide the desired over-all ratio between $U^{233}$ and slowing down material in the composition.

In addition to $U^{233}$ and neutron slowing elements of the type mentioned, suitable compositions may also include non-fissionable elements which have only slight neutron slowing action so long as such elements are not present in such amount as to capture neutrons to a greater extent than are captured by the $U^{233}$. In the case of certain elements, such as S, Ca, and certain other ones, fairly large amounts may be present without preventing the possibility of a chain reaction; with other elements, such as B, Cd, Li, and certain other ones, only very small amounts may be present because of their relatively large capture cross-section for neutrons.

It is also contemplated that the $U^{233}$, preferably with neutron slowing elements, may in addition be mixed with $U^{238}$. The action of slow neutrons on $U^{238}$ produces $U^{239}$ which decays to $93^{239}$ which in turn decays to $94^{239}$, thus supplying $94^{239}$ to aid in the continuance of the chain reaction, since $94^{239}$ is also a fissionable element which in that respect is similar to $U^{233}$. Instead of mixing the $U^{233}$ with pure $U^{238}$, it may be mixed with uranium which contains a large proportion of $U^{338}$ and a small proportion of $U^{235}$. Preferably, intimate mixtures of $U^{233}$ and uranium are made, the $U^{235}$ being present with the uranium in at least the proportion in which it is present in natural uranium. Amounts of $U^{233}$ of above about 0.1 percent are advantageous.

It is contemplated that the amount of natural uranium used in the chain reacting system described below may be decreased, and consequently the size of the system decreased, by enriching the natural uranium with $U^{233}$.

It is also within the bounds of this invention to mix the $U^{233}$ with other chain reactive isotopes such as isotopes which undergo fission with thermal neutrons, of which $U^{235}$ and $94^{239}$ are examples.

Referring to FIG. 1, in which the mass of $U^{233}$ is plotted against the concentration in water, a similar graph can be made for $U^{235}$ by simply multiplying the mass of $U^{233}$ by 1.3 and the concentration or density by 1.3. The critical mass of $U^{235}$ for various concentrations may then be determined from the graph and by interpolation the critical masses for mixtures of $U^{235}$ and $U^{233}$ can be determined.

Mixtures of $U^{233}$ with thorium which contain in the range of about 0.7 to 2 percent $U^{233}$ or higher are also capable of undergoing a self-sustaining nuclear chain reaction in a neutronic reactor such as described in an application for United States Letters Patent Serial No. 552,730, filed Sept. 5, 1944, by Gale J. Young entitled "Means and Method for Changing the Neutron Density Curve Across a Neutronic Reactor," now Patent 2,774,730, dated December 18, 1956. Such a reactor may comprise aggregates of metallic thorium containing $U^{233}$ and dispersed in a neutron moderator such as carbon as described in said application. Moreover, intimate mixtures of $U^{233}$, thorium and heavy water may be used. Such a self-sustaining controllable nuclear chain reaction is contemplated as a useful method of preparing more $U^{233}$, as more fully described hereinafter.

It is also desirable to avoid so far as possible the presence in the starting material of radioactive elements such as result from the fission of uranium by neutrons. As the chain reaction of neutrons with $U^{233}$ continues these or similar fission elements build up. But at least at the start of the reaction we prefer to use compositions substantially free from fission products since the presence of such elements makes the composition difficult to work with, and in fact in high concentrations tends to poison the mass so that the reaction may stop unless the composition which is subjected to neutron bombardment is increased in mass or increased in concentration of $U^{233}$, or relieved of fission products.

A simple device for the production of energy and fission products from $U^{233}$ by a nuclear chain reaction may consist simply of a chain reacting mass of $U^{233}$ and some means for transferring the heat produced by the chain reaction to a point outside the system for utilization. Thus, for example, a fluid medium such as water can be conducted to a place where the heat energy imparted to it from the chain reacting mass can be utilized. In this manner sufficient heat can be transmitted to convert a fluid such as water to high pressure steam which can be used to run a steam engine or turbine, which in turn can be employed to drive a generator for production of electric energy. Other methods of converting the surplus energy developed during fissioning to useful energy outside the system will be apparent to those skilled in the art.

In any of the chain reacting devices the loss of neutrons outside of the reaction mass may be decreased by reflecting escaping neutrons back into the system. This may be done by surrounding the body containing the $U^{233}$ with, for example, a material having more nuclei per cc. than about $1 \times 10^{22}$ and a greater scattering cross section than about $1 \times 10^{-24}$ square centimeters.

Suitable neutron reflecting materials are water and heavy water. One highly suitable material for neutron reflecting may be uranium, preferably uranium predominating in $U^{238}$ such as natural uranium, since uranium will not only reflect neutrons back into the system but also a certain number of additional neutrons will be produced by the uranium. Other suitable neutron reflecting materials include substances having relatively high mass numbers, such as Au, W, Pb and Pt.

It will be understood that in addition to producing energy from the chain reaction of $U^{233}$, fission products some of which are radioactive are also produced. These substances may be extracted from the remaining $U^{233}$ and used for any desired purpose, such as tracer substances in chemical and biological studies.

One device, which has particular advantages in producing energy and fission products from chain reactive compositions which are or become liquid and vaporize at elevated temperatures, consists of a pressure-tight chamber containing a body of the said chain reactive composition. Such a pressure-tight device may also have a surrounding water jacket serving as a steam boiler.

In producing $U^{233}$ a mass of thorium is reacted with neutrons, preferably with neutrons the majority of which have energies of below 1 million electron volts, since the reaction of thorium with neutrons having energies of above 2 million electron volts produces very little $U^{233}$ and considerable fission activity by the fission of thorium.

The reaction of thorium with slow neutrons may be summarized as follows:

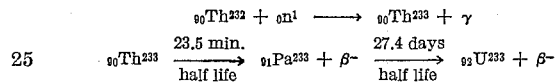

The reaction of thorium with neutrons to produce $Pa^{233}$ and $U^{233}$ may be carried out with neutrons from any suitable neutron source. Where the neutron source provides fast neutrons, the fast neutrons are slowed to neutrons having energies of below 1 million electron volts by interposing neutron slowing material between the fast neutrons and the thorium. Such neutron slowing materials include carbon-containing, deuterium-containing, or hydrogen-containing material. Sufficient neutron slowing material is used so that at least a majority of the neutrons are slowed to energies of below about 1 million electron volts, since at higher energies there is very little production of $U^{233}$, and considerable fission of the thorium. We may interpose the neutron slowing material between the fast neutrons and the thorium-containing mass, or we may admix neutron slowing material with the thorium. An intimate mixture of thorium with neutron slowing material may be readily obtained by using hydrated thorium compounds. Since the slow neutron absorption cross section of thorium is some 10 to 40 times larger than that of hydrogen, we may suitably use a ratio as high as about two to four hydrogen atoms per thorium atom without losing any more than about 10 percent of the neutrons as a result of absorption by hydrogen.

While neutrons obtained from any neutron source may be used, it is desirable to subject the thorium to neutrons from high intensity source in order that suitable concentrations of $Pa^{233}$ and $U^{233}$ may be obtained in a reasonable length of time.

Preferably, the thorium is subjected to the action of slow neutrons from a neutron source capable of delivering at least about $5 \times 10^{17}$ neutrons per second to a body of thorium and where relatively high concentration of the $U^{233}+Pa^{233}$ are desired the body should weigh no more than about 20 tons. The thorium body should be sufficiently thick as to be capable of absorbing at least 50 percent and preferably 75 percent or more of neutrons so supplied. Thorium or thorium compound 15 centimeters in depth is sufficient for this purpose. Such high neutron intensity may be obtained by subjecting thorium to the action of secondary neutrons obtained from a self-sustaining chain reaction of uranium with neutrons.

By the use of a neutron chain reacting mass neutron intensities capable of supplying between $5 \times 10^{17}$ and $10^{20}$ neutrons per second to the thorium and absorbing at least 50 to 75 percent of the neutrons supplied, a ratio of $U^{233}+Pa^{233}$ to $Th^{232}$ of at least 1 to 1 million may be attained in a reasonable length of time, such as one to three months.

In order to ensure production of $U^{233}$ in a form such as to be recoverable in a concentrated state the thorium subjected to treatment preferably is substantially free or contains but negligible amounts of natural uranium. In any case the amount of natural uranium present should not be in excess of 20 percent by weight of the $U^{233}$ produced and production of $U^{233}$ should be continued until at least 80 percent by weight of the total uranium content is $U^{233}$. Generally speaking the natural uranium content should not exceed about one part by weight per million parts by weight of thorium and preferably should be no more than one part in ten million parts of thorium.

The thorium bombarded product comprises a preponderant quantity of thorium, a small quantity of $U^{233}$ and a smaller amount of fission products. Where the product is not of substantial age it also contains an appreciable quantity of $Pa^{233}$ the amount thereof gradually decreasing due to its decay of $U^{233}$. Where recovery of a maximum of $U^{233}$ is desired the product is permitted to age until much of the $Pa^{233}$ has decayed for example one or more months. Where bombardment of the thorium has proceeded over a period of several weeks this may be unnecessary since an adequate quantity of $U^{233}$ may be secured due to decay during the bombardment and further delay to increase the yield may be unnecessary.

The $U^{233}$ may be obtained in useful and concentrated form from the neutron irradiated thorium mass made in accordance with this invention by any method which will separate thorium from the reaction mass, and which preferably also will remove at least a portion of the fission products. Since $Pa^{233}$ decays to $U^{233}$, it is not necessary to separate the protoactinium from the uranium so that any method of separating thorium from uranium, whether or not it separates the uranium from the protoactinium, is useful. Likewise, any method of separating thorium from protoactinium, whether or not the protoactinium is separated from the uranium is useful.

However, care must be taken in the concentration of $U^{233}$ into a single body that the body is not so large that the $U^{233}$ in the body will spontaneously undergo a self-sustaining nuclear chain reaction with neutrons. In the present case it is believed that a pure mass of $U^{233}$ metal or compounds of less than 5 pounds may be safely isolated in a single mass in the form of a sphere and that for masses in shapes other than spherical considerably larger masses may safely be isolated.

There are a number of suitable procedures for separating $U^{233}$ and/or $Pa^{233}$ from thorium. Three such procedures which have the advantage of also removing at least a portion of the fission products will be described.

In one method of obtaining $U^{233}$ we continuously remove $Pa^{233}$ as it is formed by the reaction of neutrons with thorium; and in this case of course we may terminate the reaction at any time. Since the $Pa^{233}$ is removed before the formation of any appreciable amount of $U^{233}$ there is no fission activity and no fission products to be separated when care is taken to keep the neutron energies below that at which fission of thorium occurs (i.e., below about 1 million electron volts). In this continuous process, a mass of thorium, for example in the form of powdered thorium fluoride, is subjected to slow neutrons and at the same time hydrogen fluoride at a temperature of about 500° C. is circulated through the mass of thorium fluoride. The $Pa^{233}$ fluoride formed by the action of the hydrogen fluoride volatilizes away from the thorium fluoride and may be collected in a separate chamber where it may be allowed to decay to $U^{233}$. Thus pure $U^{233}$ fluoride may be obtained. The $U^{233}$ fluoride is collected in a unit mass having a mass and shape such that a nuclear chain reaction will not occur, for example, a sphere of 5 pounds or less.

There are a number of procedures which may be used for the batch separation of $U^{233}$ and/or $Pa^{233}$ from masses of neutron irradiated thorium. For example, a hydrogen fluoride treatment accompanied by a fluorine treatment may be used. In this procedure thorium oxide (if any other thorium compound were used, it would preferably be converted to the oxide as the first step in this chemical extraction procedure) is treated with hydrogen fluoride at about 500° C. so as to convert the thorium oxide to the fluoride. The protoactinium fluoride and some of the radioactive fission products are volatilized away as volatile fluorides during this procedure. In the next step, fluorine is passed over the thorium and $U^{233}$ fluoride mixture, at a temperature of 300 to 500° C., and the $U^{233}$ volatilized away from the thorium fluoride and the remainder of the fission products in the form of the hexafluoride. Agitation of the fluoride mixture during the passage of the fluorine over it is useful to expedite the removal of the $U^{233}$ as volatile hexafluoride in this step. The volatile $U^{233}$ hexafluoride, which will be very free from other material, may then be condensed as the solid or converted into soluble uranyl fluoride by bubbling through water. The thorium fluoride may be dissolved in acid and converted back to the oxide for further use. It should be noted, however, that this method for the extraction of $U^{233}$ is one in which we may suitably have the neutron-absorbing thorium mass in the form of the fluoride. This makes possible a very simple cyclic process in which the thorium fluoride, after the absorption of a number of neutrons so as to contain an appreciable amount of $U^{233}$ may be treated with hydrogen fluoride and fluorine, so as to remove the pure $U^{233}$, and the thorium fluoride is then ready for use again.

Another chemical extraction method involves the use of one or more peroxides such as $H_2O_2$, $Na_2O_2$, etc. The thorium compound containing the $U^{233}$ is dissolved in acid. It is important that there be present before the precipitation some oxidizing agent, such as nitric acid, so as to be sure that the uranium is in the uranyl form. After the adjustment of the acidity to a pH of about 3, the thorium and the uranium are precipitated together as peroxides by the addition of an excess of hydrogen peroxide. After the removal of the supernatant liquid, the peroxide precipitate is treated with a solution of an alkali such as potassium or sodium hydroxide. Uranium peroxide dissolves readily in sodium or potassium hydroxide solution, while thorium peroxide is insoluble, so that a separation of the $U^{233}$ from the thorium is effected by this operation. The $U^{233}$ may then be separated from this alkaline solution by lowering the alkalinity so as to precipitate either sodium uranate and/or uranium peroxide. The fission products with the $U^{233}$ at this stage are removed by dissolving and reprecipitating as the peroxide several times. Here also a cyclic process may be effected in that the thorium peroxide may be used as the neutron-absorbing medium, and, after treatment with sodium or potassium hydroxide and sodium peroxide solution so as to extract the $U^{233}$, the thorium peroxide will be ready for use again.

A third method of chemical separation of the $U^{233}$ from the thorium is based upon the precipitation of the thorium as the fluoride. In this method the neutron-absorbing thorium compound is dissolved in acid and, after adjustment of the pH to a value around one, the thorium is precipitated as the fluoride by the addition of an excess of hydrogen fluoride solution. In this operation the $U^{233}$ is separated from the thorium since it remains in solution as the soluble uranyl fluoride. It is important that there be present before the precipitation some oxidizing agent, such as nitric acid, so as to be sure that the uranium is in the uranyl form. A variation of this procedure, which may be even more desirable in some cases, involves the substitution of iodate (or oxalate or phosphate) for the fluoride. Thorium is precipitated from the acid solution as the insoluble thorium iodate (or oxalate or phosphate) upon the addition of an alkali iodate (or oxalate or phosphate) salt while the soluble uranyl iodate (or oxalate or phosphate) remains in solution. In general precipitants of the type capable of precipitating thorium and rare earths from acid solution are suitable. The uranium may then be separated from the uranyl fluoride (iodate, phosphate or oxalate) solution by the addition of sodium hydroxide or ammonium hydroxide. The fission products with the $U^{233}$ at this stage are removed by converting the $U^{233}$ to the uranyl nitrate and extracting this with ether so as to leave the fission products in the aqueous phase.

The following examples in which the amounts and concentrations of $U^{233}$ are expressed in terms of elemental $U^{233}$, are given solely to illustrate the invention and are not to be considered as limiting the invention to the details described therein:

*Example I*

SYSTEM $U^{233}+H_2O$ 1000 grams of $U^{233}$ in the form of uranium ($U^{233}$) sulphate are dissolved in 40,000 grams of water. The solution is poured into a spherical pressure container. This container has a jacket formed from double walls of steel of 0.2 cm. thickness spaced 20 cm. apart and through which water is circulated so that a wall of water of 20 cm. thickness surrounds the solution. The nuclear self-sustaining chain reaction starts in the solution by itself and continues until the mass is decreased below the critical amount for $U^{233}$ or until it becomes poisoned from the production of fission products. Heat is evolved during the reaction and this heat is conducted to the water in the jacket, converting the water into steam which may be used to run an engine or turbine. The solution in the container is kept under pressure so that it remains liquid at the high temperature of the reaction.

While the device controls itself due to the fact that both solution density and neutron diffusion length change with temperature, neutron absorbing material may be used if desired. For example, rods of neutron absorbing material such as cadmium or boron-steel may be pushed out of or into the interior of the composition to serve as an auxiliary control. Thus if the rate of neutron production is too low to maintain a chain reaction or to maintain the temperature at the desired value control rods may be removed until the proper rate of production has been achieved after which they may be reinserted far enough to cause the rate of production of neutrons to remain constant or if desired to decrease.

The above example gives suitable operating conditions. The minimum concentration of $U^{233}$ which will undergo a chain reaction with slow neutrons (using a dispersion of $U^{233}$ in water in a spherical container, and in the absence of a reflecting casing) is about $10^{-2}$ gm. per cc. The maximum concentration which is controllable as a slow neutron chain is about 10 gm. per cc. With larger concentrations the rate of production of neutrons increases so rapidly that it is difficult or impossible to stop the reaction or hold it to a constant rate.

The minimum amount of $U^{233}$ for thermal neutron reaction varies from a low of about 1 kg. at about 0.03 gm. per cc. concentration, to infinity at just below the minimum concentration, and to about 50 kg. (See FIGURE 1.)

The effect of the water jacket, which acts as a neutron reflecting casing, is to decrease the minimum amount of $U^{233}$ which will undergo a self-sustaining chain reaction. Where containers other than spherical are used the minimum amounts are increased.

*Example II*

SYSTEM FOR $U^{233}+$PARAFFIN

The values for critical masses and concentrations for this system are practically the same as for the $U^{233}+$water system (see FIGURE 1). The $U^{233}$ may be in the form of discrete particles of metallic $U^{233}$ of less than .2 mm. diameter dispersed in the paraffin.

*Example III*

SYSTEM FOR $U^{233}+$HEAVY WATER

The minimum suitable concentration of $U^{233}$ is about $10^{-4}$ gm. per cc. of heavy water, the maximum concentration for effective control being about 1 gm. per cc. The minimum critical amount of $U^{233}$ is about 1 kg. at a concentration of about $10^{-3}$ gm. per cc. of heavy water. (See FIGURE 2.)

*Example IV*

SYSTEM FOR $U^{233}+$CARBON

The minimum suitable concentration of $U^{233}$ uniformly dispersed in a carbon mass is about $10^{-4}$ gm. per cc. of carbon, and the maximum concentration for effective control is about 1 gm. per cc. The minimum critical amount of $U^{233}$ is about 5 kg. at a concentration of about $10^{-3}$ gm. per cc. of carbon. (See FIGURE 3. Carbon of density about 2 gm. per cc. is referred to.) In using a solid neutron slowing medium it is usually found necessary to cool the assembly internally to prevent overheating and consequent injury to the product. Consequently cooling tubes are located in the carbon and cooling liquid such as helium, water, diphenyl, mercury, vapor, etc. circulated therethrough. By permitting the assemblage to operate at a sufficiently high temperature the heat removed from the cooling water may be abstracted and used to generate power.

The above examples show suitable amounts and concentrations of $U^{233}$ in various dispersing media for attaining a chain reaction. When metallic $U^{233}$ is employed, it is preferably intimately dispersed in particles of less than about 0.2 mm. diameter throughout the dispersion medium. Approximately the same relations shown for the dispersions of metallic $U^{233}$ will also hold for dispersions or solutions containing compounds of $U^{233}$ with other elements, where the absorption cross sections of such other elements are less than about $10^{-24}$ square centimeters. Thus, the relations will hold for dispersions in heavy water, water or carbon of such materials as the sulphates, carbonates and oxides of $U^{233}$.

*Example V*

A saturated solution of thorium nitrate hexahydrate, $Th(NO_3)_4.4H_2O$, was bombarded by neutrons formed in a 60 inch cyclotron when beryllium was bombarded with deuterons. .5 kg. of the thorium nitrate solution, which had been bombarded with the neutrons obtained from about 14,000 microampere hours of deuterons on beryllium, was diluted with 26 liters of water and made about 0.5 N in nitric acid. 400 grams of manganous chloride was added, the solution heated and $MnO_2$ precipitated from the hot solution in three separate portions by addition of potassium permanganate. Each precipitate was centrifuged out separately. The precipitates were dissolved in a mixture of hydrochloric acid and hydrogen peroxide. After decomposing the peroxide by boiling, 200 mg. of zirconium oxychloride was added and the zirconium precipitated as a phosphate by addition of phosphoric acid. The precipitate was centrifuged out and several further precipitations of zirconium phosphate were made using 100 mg. portions of zirconium oxychloride. The precipitates containing zirconium and $Pa^{233}$ were dissolved in dilute hydrofluoric acid, cooled with ice water and zirconium and $Pa^{233}$ precipitated with dilute NaOH solution. This precipitate was dissolved in nitric acid and the $Pa^{233}$ carried away by a series of $MnO_2$ precipitations. This cycle was repeated twice and a small zirconium phosphate precipitate containing $Pa^{233}$.

The zirconium precipitate was dissolved in hydrofluoric acid and $Pa^{233}$ precipitated with dilute NaOH. The hydroxide precipitate was dissolved in sulphuric acid and the solution evaporated to dryness. The solution was dissolved in 30 cc. of 0.33 M ammonium fluoride and the hydrogen in concentration adjusted to correspond to that of the methyl red indicator endpoint. The $Pa^{233}$ was isolated by electrodeposition using a copper disk cathode and a motor driven platinum stirrer as an anode. The plating was carried out for 8 hours at 100 milliamperes of current and about 15 volts impressed voltage. About 90 precent of the $Pa^{233}$ plated out as a thin film.

After 100 days the $U^{233}$ was separated from undecayed $Pa^{233}$ by dissolving in 6 N hydrochloric acid containing a few drops of 6 N nitric acid. Copper was removed by precipitation with $H_2S$ and about 70 percent of the $Pa^{233}$ was removed by addition of 0.1 mg. of zirconium as oxychloride and precipitating the zirconium as phosphate using a few thousandths of a cc. of 85 percent phosphoric acid. This precipitation step was repeated 15 times whereupon most of the $Pa^{233}$ was removed.

The resulting solution was evaporated to a volume of about 0.1 cc. and 0.02 cc. of glacial acetic acid was added and the solution, etc. diluted to 5 cc. The resulting solution was electrolyzed for 8 hours at 90 milliamperes of current and 8 volts impressed voltage whereupon most of the $U^{233}$ plated out and the plate appeared as a dark brown film having a weight about 0.2 mg./cm.$^2$.

3.8 micrograms of the $U^{233}$ so plated upon the platinum-coated copper disk was placed on one electrode of a shallow ionization chamber connected to a linear pulse amplifier which was adjusted to record the pulses due to fissions. The $U^{233}$ was bombarded with neutrons using a 300 mg. Ra–Be source of neutrons and the neutron source and ionization chamber were surrounded with paraffin. The neutron bombardment was continued for a period of 8 hours during which fissions producing radioactive fission products occurred at an average rate of about 88 per hour.

Compounds of $U^{233}$ and particles of metallic $U^{233}$ which may be dispersed in neutron slowing material may be made, for example, as described in our copending application Serial No. 561,834, filed November 3, 1944. Likewise this application discloses methods of making shaped articles of metallic $U^{233}$ and compounds of $U^{233}$.

In the foregoing description, wherever reference is made to the presence or the addition of phosphoric acid or a phosphate, unless otherwise indicated by the context, it is to be understood that the reference is to orthophosphoric acid or its salts.

By the above methods of separating $U^{233}$ from foreign products we are able to obtain compositions composed largely or entirely of $U^{233}$ compounds, and which are substantially free from fission products. The $U^{233}$ metal may be produced from suitable compounds by calcium reduction or any of the other known methods for producing uranium metal from compounds of uranium.

$U^{233}$ metal or compounds of $U^{233}$ may be shaped into the form of spheres, cylinders, blocks or the like by known methods of shaping uranium metal and compounds. Such shaped articles of manufacture may be used as a source of nuclear power, as disclosed in the present application.

While there has been described certain embodiments of our invention, it is to be understood that it is capable of many modifications. Changes, therefore, may be made without departing from the spirit and scope of the invention as described in the appended claims, in which it is the intention to claim all novelty in the invention as broadly as possible.

We claim:
1. In a device for the production of nuclear energy, a body consisting essentially of atoms of uranium having a mass number of 233 distributed in a neutron slowing substance having a capture cross section for neutrons of less than about $10^{-24}$ square centimeters and a mass of less than about 30 mass units, the amount of said uranium being such that the radius of the mass is of the order of the distance required for slowing neutrons from fission energies to thermal energies, and the concentration being such that the probability of capture of neutrons by said atoms of uranium is greater than the probability of capture of neutrons by the slowing down substance to produce a self-sustaining chain-reaction through the action of neutrons emitted during fission.

2. A neutronic reactor comprising a spherical body of a dispersion of $U^{233}$ in a moderating material of low atomic weight selected from the group consisting of water, heavy water and carbon, the concentration of $U^{233}$ in the moderating material being as indicated by an abscissa of a point on the curves of respective FIGURES 1, 2 and 3 of the appended drawings, and the mass being at least equal to the mass indicated by the ordinate of such point.

3. The reactor set forth in claim 2 wherein the moderating material is water.

4. The reactor set forth in claim 2 wherein the moderating material is heavy water.

5. The reactor set forth in claim 2 wherein the moderating material is carbon.

6. The reactor set forth in claim 2, said reactor further comprising a mass consisting essentially of natural uranium surrounding the spherical body whereby neutrons at the surface thereof are reflected back into the $U^{233}$ and moderator material.

7. The device of claim 1 wherein the neutron slowing substance is water.

8. The device of claim 1 wherein the neutron slowing substance is heavy water.

9. The device of claim 1 wherein the neutron slowing substance is carbon.

References Cited in the file of this patent

UNITED STATES PATENTS

| | | |
|---|---|---|
| 2,774,730 | Young | Dec. 18, 1956 |

FOREIGN PATENTS

| | | |
|---|---|---|
| 114,150 | Australia | May 2, 1940 |
| 233,011 | Switzerland | Oct. 2, 1944 |

OTHER REFERENCES

Chem. Abstr., vol. 32 (1938), page 7815.
Meitner et al.: "Physik, 109, pp. 538–552 (1938).
Hopkins: "Chapters in the Chemistry of the Less Familiar Elements," vol. II, chapter 18, page 7, Stipes Publishing Co. (1939).
Bohr et al.: Phy. Rev. 56, 426–450 (1939).
Nier: Phy. Rev. 55, 150–153 (1939).
Physical Review, volume 55 (1939), pages 510, 511, 512.
Physical Review, volume 57 (1940), pages 748, 749.
Physical Review, March 15, 1940, page 546.
Physical Review, vol. 59 (1941) pages 212, 213, 321, 834, 835.
Goodman: "The Science and Engineering of Nuclear Power," vol. 1, pages 275 and 364, Addison-Wesley (1947).